March 16, 1926.
H. S. ROCHOWIAK
1,576,932
DEMOUNTABLE RIM
Filed Dec. 5, 1923
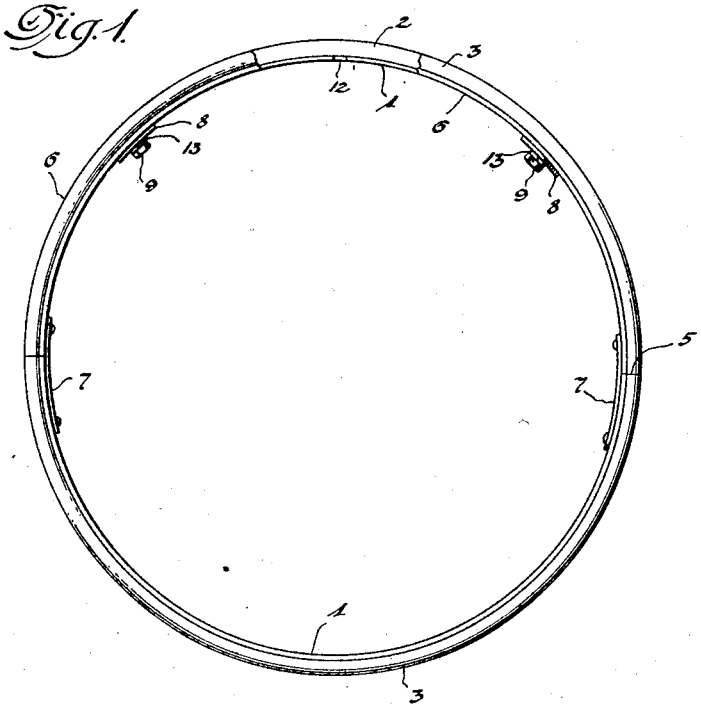
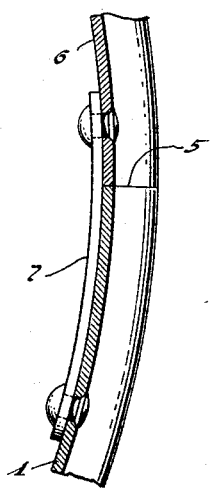
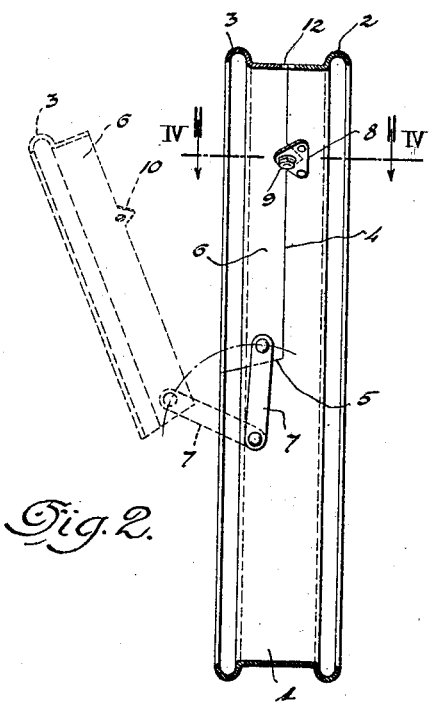
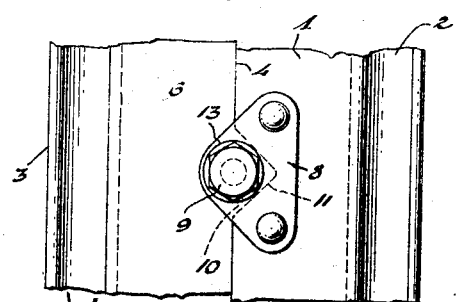
Inventor:
Harold S. Rochowiak
By
Attorneys Patented Mar. 16, 1926.

1,576,932

UNITED STATES PATENT OFFICE.

HAROLD S. ROCHOWIAK, OF DETROIT, MICHIGAN.

DEMOUNTABLE RIM.

Application filed December 5, 1923. Serial No. 678,615.

*To all whom it may concern:*

Be it known that I, HAROLD S. ROCHOWIAK, a citizen of the United States, residing at Detroit, in the county of Wayne and State of Michigan, have invented certain new and useful Improvements in Demountable Rims, of which the following is a specification, reference being had therein to the accompanying drawings.

This invention relates to a demountable rim and has special reference to that class of rims which are detachably mounted on a wheel felloe or fixed rim and adapted for supporting a tire, preferably of the pneumatic type, so that the tire may be easily and quickly removed from the rim, particularly after said rim has been removed from a wheel. Ordinarily the tire supporting rims are split and are adapted to have the ends thereof retracted whereby the rim can be removed from the tire to permit of an outer casing being removed from an inner tube or the inner tube removed from the outer casing. Such an operation is tedious and laborous, and my invention in its broadest aspect, aims to minimize the time and labor ordinarily required in mounting and demounting tires relative to rims.

My invention also aims to provide a rim, the greater part of which is solid, the rim being furnished with a movable tire retaining portion or section which is laterally shiftable from the body of the rim to permit of a portion of the tire being shifted in advance of the entire tire.

My invention further aims to provide an annular tire supporting body with a shiftable one quarter section or portion articulated relative to the body so that the quarter portion may be bodily moved to facilitate demounting a tire and just as readily placed in position to retain the tire on the annular body. Novel means is employed for holding the shiftable portion of the rim body in a closed or active position.

My invention will be hereinafter specifically described and then claimed, and reference will now be had to the drawing, wherein Fig. 1 is a side elevation of the demountable rim;

Fig. 2 is a vertical cross sectional view of the same showing, by dotted lines, the shiftable section or portion of the rim in an open position;

Fig. 3 is a longitudinal sectional view of a portion of the rim showing one of the hinge members thereof;

Fig. 4 is an enlarged cross sectional view taken on the line IV—IV of Fig. 2, showing one of the fasteners, and Fig. 5 is a plan of the fastener.

A rim in accordance with my invention comprises an annular body 1 having the side edges thereof rolled or otherwise fashioned to form flanges or members 2 and 3 and such members are adapted to retain a conventional form of tire on the rim.

The annular member 1 is split for a portion of its circumference and divided for approximately half its width, as at 5, so as to form a shiftable or removable quarter section or portion 6 which will serve as a tire retaining member. The shiftable portion 6 has its ends cut on a bias or angle, and pivotally connected to the inner wall of the tire retaining member 6, and at its ends are curved links 7 which are pivotally connected to the inner wall of the body 1 adjacent the ends of the tire retaining member 6. The curved links serve as hinges for the tire retaining member 6 and permit of said member being bodily removed and swung laterally from the outer side of the body 1, as shown by dotted lines in Fig. 2, and it is obvious that the tire retaining member may be just as readily replaced on its seat of the annular member 1.

Assuming that the rim is in a position where the tire retaining member 6 is at the upper side thereof, said member may be pulled outwardly and swung downwardly, thus releasing the upper outer edge of a tire that may be on a rim. The upper portion of the tire can then be pulled outwardly off of the upper portion of the rim, the tire lowered out of engagement with the lower part of the rim, and then removed entirely free of the tire retaining member 6. This manner of removing a tire is reversed to place the tire on a rim and after being properly seated on the rim the tire retaining member may be pushed to a closed position so that it will complete the rim and prevent accidental displacement of the tire.

Various kinds of fasteners may be used for locking the shiftable tire retainig member 6 relative to the annular rim body 1. As an instance of such fasteners I show plates 8 which are riveted or otherwise mounted on the body 1 and said plates are adapted to extend on to the inner wall of the movable quarter portion or tire retaining member 6. Screwed into the overlapping portions of the plates 8 are screw bolts 9 that may be provided with locking washers 13 and said screw bolts are adapted to enter tongues 10 which fit into notches 11 provided therefor in the body 1. The tongues and notches may be V-shaped or of any desired configuration which will tend to interengage the confronting edges of the tire retaining member 6 and the annular rim body 1.

In addition to the tongues and notches, which are preferably disposed at intervals, there may be notches 12 providing clearance for the air filling tube of a pneumatic tire.

What I claim is:—

1. A rim adapted for supporting a tire, said rim comprising a main portion and a laterally movable portion adapted to be swung outwardly relative to the main portion so that said tire may be removed, and curved links having ends pivotally connected to said laterally movable portion and other ends pivotally connected to said main portion, so that said laterally movable portion may be swung bodily to and from said main portion.

2. A rim as called for in claim 1, and tongues on said laterally movable portion adapted to enter notches of said main portion, plates on said main portion at the notches thereof, and screw bolts carried by said plates for holding said laterally movable portion relative to said main portion.

In testimony whereof I affix my signature.

HAROLD S. ROCHOWIAK.